United States Patent Office 3,729,457
Patented Apr. 24, 1973

3,729,457
MACRONET POLYSTYRENE STRUCTURES FOR IONITES AND METHOD OF PRODUCING SAME
Vadim Alexandrovich Davankov, Leningradskoe shosse 112/1, korpus 3, kv. 703; Sergei Vasilievich Rogozhin, ulitsa Vavilova 55/5, kv. 52; and Maria Petrovna Tsjurupa, Pokrovsky bulvar 14/5, kv. 69, all of Moscow, U.S.S.R.
No Drawing. Filed Sept. 11, 1970, Ser. No. 71,350
Claims priority, application U.S.S.R., Sept. 12, 1969, 1,360,771
Int. Cl. C08f *19/02*
U.S. Cl. 260—88.2 C       4 Claims

ABSTRACT OF THE DISCLOSURE

Macronet polystyrene structures for ionites, characterized in that they consist of cross-linked polystyrene or cross-linked copolymers of styrene with divinylbenzene in which the content of the divinylbenzene in the copolymers is up to 1 mole percent, and the linking bridges between the benzene rings of the polystyrene chains are as follows

where $R = CH_2$, $CO$; $n = 1,2,3$

The proposed macronet structures can be produced by using a method providing for treatment of polystyrene or granular copolymers of styrene with divinylbenzene, the latter being included in the copolymers in an amount of up to 1 mole percent, by a cross-linking agent in a medium of an organic solvent in the presence of the Friedel-Crafts catalyst. The cross-linking agent is composed of bisfunctional compounds of the general formula

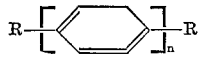

where $R = CH_2Cl$, $COCl$; $n = 1,2,3$

These structures feature a high mechanical strength and have adequately long, rigid, chemically stable bridges regularly arranged between the polystyrene chains and capable of carrying the same ionogenic groups as those carried by the polystyrene chains.

The ionites based on these structures have a high exchange capacity (e.g. up to 5.35 meq./g. for sulphocationite), high osmotic stability and high kinetic characteristics

---

The present invention relates to insoluble polymer backbones for ion exchange resins and, more particularly, the invention relates to macronet polystyrene structures for ionites and to methods of producing the same.

The proposed structures can find wide application in synthesis of anionites, cationites and special ion-exchange resins (complex-forming, dissymmetric, etc.).

Known in the art are insoluble polymer structures for ion-exchange resins and the methods of their production through a reaction of copolymerization of monovinyl aromatic compounds, for example styrene, with divinyl monomers serving as cross-linking agents. As a rule, the cross-linking agent for styrene is divinylbenzene. Depending on a method of copolymerization and on amount of a cross-linking agent, two different basic types of polystyrene structures are obtained.

By carrying out the copolymerization in the presence of a precipitant and by using large quantities of divinylbenzene, macroporous structures are produced. The principal disadvantage of these structures consists in that the ionites based thereon feature a low exchange capacity in relation to large organic ions. The above-mentioned ionites are penetrable for the large ions solely within the region of the surface of the macropores and not through the whole volume of the ionite granule.

This advantage is not peculiar to conventional copolymers of styrene with divinylbenzene obtained without a precipitant by applying a small amount of divinylbenzene. However, the ionites based on such copolymers have an extremely low mechanical strength in a swollen state and considerably change their volume by changing the eluents. The mechanical strength of such copolymers can be increased by increasing the amount of the divinylbenzene. In this case, however, the penetrability of the ionites for large organic ions is drastically reduced.

Therefore, the ionites based on macronetwork polymer structures have been used in the last few years. The macronetwork polymer structures are obtained through co-polymerization of styrene with the long-chain cross-linking agents, for example with dimethacrylate of ethylene or diethylene glycol or diphenylolpropane N,N″-alkylenedimethacrylamide and the like.

The ionites based on macronet backbones have adequate mechanical strength and good penetrability for large organic ions, say, antibiotics. However, they also have significant disadvantages. The volume of the ionites drastically changes in the process of sorption and regeneration and this is associated with an inadequate rigidity of the linking bridges. The ester and amide bonds of such cross-linking agents are easily hydrolysed. The bridges as a rule do not carry ionogen groups, therefore, are a ballast in the general structure of the ionite. Due to a different reaction activity of styrene and the cross-linking agent used for the copolymerization, the obtained copolymers are extremely heterogeneous. This fact as well as the change of the ionite volume in the case of changing of the eluent reduce the service life of the ionites.

Better results can be obtained if the macronet polymer structures are produced by means of cross linking the linear chains of the polymers instead of the reaction of copolymerization. Such three-dimensional polymer structures are produced by linking a chloromethylated styrene divinylbenzene copolymer of styrene with up to 1 mole percent of divinylbenzene by means of chloromethyl groups in a medium of an organic solvent in the presence of the Friedel-Crafts catalysts, for one, aluminium chloride. Thus produced macronet structures consist of cross-linked polystyrene or cross-linked styrene copolymer with divinylbenzene, the content of the latter in the copolymer being up to 1 mole percent, bridges represent two benzene rings with a methylene group therebetween.

A significant disadvantage of the last-mentioned method consists in difficulties associated with production of macronet polystyrene carcasses having a predetermined amount of the linking bridges, therefore, in difficulties connected with reproduction of the results.

An object of the present invention is to provide mechanically strong macronet polystyrene structures having adequately long, rigid, and chemically stable bridges evenly distributed between the polystyrene chains, which bridges can carry the same ionogenic groups as those carried by the polystyrene chains.

Another object of the invention is to develop a method of producing the structures with the above-said properties.

According to these and other objects the invention consists in application of macronet polystyrene structures based on cross-linked polystyrene or cross-linked copolymers of styrene with divinylbenzene, the content of the latter being within the range of up to 1 mole percent, the binding bridges between the benzene rings of said polymers, according to the invention being as follows

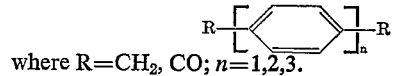

where $R = CH_2$, $CO$; $n = 1,2,3$.

The above-said structures feature a high mechanical strength, and have adequately long, rigid and chemically stable bridges regularly disposed between the polystyrene chains and capable of carrying the same ionogenic groups as those carried by the polystyrene chains.

The proposed macronet polystyrene structures can be produced by a method consisting in treatment of polystyrene or copolymers of styrene with divinylbenzene by a cross-linking agent in a medium of an organic solvent in the presence of the Friedel-Crafts catalyst the content of divinylbenzene in the copolymers being up to 1 mole percent. According to the invention, the cross-linking agent is composed of bifunctional compounds of the general formula

where $R=CH_2Cl, COCl; n=1,2,3$.

This method makes it possible to produce three-dimensional backbone of a regular structure with a statistical distribution of a prescribed amount of linking bridges throughout the whole volume of the backbone. Owing to this fact, any change in the volume of the ionite beads with this structure is not associated with local internal stresses and this, in turn, provides for high osmotic and mechanical strength of the sorbents.

The cross-linking agents of the above-said general formula are easily reacted with polystyrene according to method of Friedel-Crafts. Due to the cross-linking bridges the polystyrene chains are separated for a considerable distance from each other and are held in this condition owing to the rigidity of the structure of the formed bridges. This is responsible for a high penetrability of the ionites based on the produced structures for large organic ions.

That the structure of the future ionite is formed in a solution of polystyrene or in maximally swollen granules of copolymer of styrene with divinylbenzene is an advantageous distinctive feature of the proposed method of synthesis of a polystyrene structure as compared with the methods presently used. The structure is formed from solvated polystyrene chains and this is best suited to the conditions of operation of the ion-exchange resins. This fact is also responsible for high osmotic resistance of the ionites produced on the basis of the proposed macronet structures.

If the cross-linking agents consist of bis-chloromethyl derivatives of aromatic hydrocarbons, hydrocarbon-type linking bridges are obtained. If dichloranhydrides of dicarbonic acids are used, the linking bridges contain two ketonic groups. In both cases the chemical stability of the bridges is not lower than that of the main polymer chain.

At all chemical transformations of the structures (sulphonation, chloromethylation, phosphorylation, etc.), the bridges act in the same way as the benzene rings of the main polystyrene chain. Owing to this fact the exchange capacity of the obtained ionites is not deteriorated by any increase in the amount of the bridges.

Depending on the quantity of the cross-linking agents introduced into the reaction, the polymer structures having different penetrability and swelling capacity are produced (from high-swelling gels to rigid microporous structures).

The ionites produced through the use of standard methods (e.g. sulphonation, chloromethylation, phosphorylation) on the base of the proposed macronet structure are featured by a high exchange capacity (for example up to 5.35-meq./g. for the sulphocationites), high osmotic stability and high kinetic characteristics. Thus, the diffusion velocity of an ion of tetrabutylammonium penetrating into the ionite based on the proposed macronet structure cross-linked through 8 mole percent of dichloranhydride of terephthalic acid is much higher than that of the same penetrating into the ionite based on the known structure consisting of styrene copolymer having the same mole content of divinylbenzene used as cross-linking agent.

The proposed macronet polystyrene structures for ionites are produced as follows.

Added into a solution of polystyrene in an organic solvent or to a suspension of swollen granular copolymer of styrene with divinylbenzene, the content of the latter in the copolymer being up to 1 mole percent, are solutions of the cross-linking agent and the Friedel-Crafts catalyst in organic solvents. In this case the cross-linking agents are 4,4'-dichloromethyldiphenyl, paraxylylenedichloride, 4,4'-dichloromethyltriphenyl, dichloranhydride of 4,4'-diphenyldicarbonic acid, dichloranhydride of terephthalic acid and dichloranhydride of 4,4'-triphenyldicarbonic acid. The medium may be composed of any organic solvent which does not deactivate the Friedel-Crafts catalysts (aluminium chloride, tin chloride, etc.) and dissolves polystyrene. Such solvents include dichlorethane, nitrobenzene, dichloromethane, chlorobenzene, etc.

The synthesis of the macronet polystyrene structure can be effected within the temperature range from 0° C. to the boiling point of the solvent. The temperature and time required for the process depend on the amount of the catalyst taken for the reaction.

The dark brittle gel formed in the case of using the solution of linear is washed from the catalyst and is dried. In the case of using the granular copolymer the structure is obtained in the form of granules which are also washed from the catalyst and dried.

The synthesis of the ionites based on the proposed macronet polymer structures is effected by the known methods (sulphonation, chloromethylation followed by amination, phosphorylation, etc.) with isolation of the obtained in the cross-linking process structures from the reaction mixture or without the isolation.

The following examples are given to illustrate the preparation of the macronet polystyrene structures for ionites.

EXAMPLE 1

To a solution containing 1.04 g. (10 mmol. of monomer units) of polystyrene in 2.5 ml. of dichloroethane was added a solution containing 0.251 g. (1 mmol.) of 4,4'-dichloromethyldiphenyl and 0.0521 g. (0.2 mmol). of tin chloride in 2 ml. of dichloroethane. The mixture was heated at a temperature of 60° C. during 4 hours. The formed dark gel was crushed to small pieces, washed with acetone, a mixture of acetone with 0.5 n solution of hydrochloric acid, 0.5 n solution of hydrochloric acid, water, and was dried. The swelling capacity of the obtained product in toluene was equal to 2.4 g. of the solvent per gram of the weight of the dry product.

The dried product was swollen in dichloroethane and then was sulphonated with 98% sulphuric acid at 80° C. during 3 hours. In this case there was produced a cationite with an exchange capacity of 5.35 meq./g.

EXAMPLE 2

Added to 1.04 g. (10 mmol. of monomer units) of granular copolymer of styrene with 0.3 mole percent divinylbenzene was a solution of 0.251 g. (1 mmol.) of 4,4'-dichloromethyldiphenyl in 10 ml. of dichlorethane. The prepared mixture was held at room temperature during 12 hours for swelling the granules. Then the mixture was cooled to a temperature of 5° C., 0.0521 g. (0.2 mmol.) of tin chloride in 1 ml. of dichloroethane was added thereto, thereafter, the mixture was carefully stirred and heated to 60° C. during 4 hours. After that a small portion of the obtained product was washed with acetone, a mixture of acetone with 0.5 n solution of hydrochloric acid, 0.5 n solution of hydrochloric acid, water and was dried. The swelling capacity of the cross-linked polymer in toluene was equal to 1.7 gram of the solvent per gram of the dry weight of the copolymer.

The remaining mass of the cross-linked copolymer was chloromethylated, said copolymer being not isolated from the reaction mixture. For this purpose the reaction mixture was cooled to room temperature, provided with 2.82 g. (35 mmol.) of monochlorodimethyl ether and with 0.026 g. (0.1 mmol.) of tin chloride and was held at room temperature during 24 hours. Then the mixture was washed as described above and was dried. The content of chlorine in the copolymer was equal to 22%. Then, by treating the chloromethylated copolymer with an aqueous solution of trimethylamine, an anionite was obtained having an exchange capacity of 4.75 meq./g.

EXAMPLE 3

Added to a solution containing 1.04 g. (10 mmol.) of polystyrene in 8 ml. of dichloroethane was a solution containing 0.279 g. (1 mmol.) of dichloranhydride of 4,4'-diphenyldicarbonic acid and 0.266 g. (0.2 mmol.) of aluminium chloride in 8 mm. of nitrobenzene. The mixture was heated at a temperature of 60° C. during 3 hours. The prepared gel was crushed to small pieces, washed with acetone, a mixture of acetone with 0.5 n solution of hydrochloric acid, 0.5 n solution of hydrochloric acid, water and was dried. The swelling capacity of the obtained product in toluene was equal to 2.7 g. of the solvent per gram of the weight of the dry product.

The dried product was subjected to swelling in dichloroethane and was sulphonated by 98% sulphuric acid at a temperature of 80° C. during 3 hours. In this case a cationite was produced having an exchange capacity of 5.2 meq./g.

EXAMPLE 4

Added to a solution containing 1.04 g. (10 mmol.) of polystyrene in 5 ml. of dichloroethane was a solution containing 0.175 g. (1 mmol.) of paraxylylenedichloride and 0.521 g. (2 mmol.) of tin chloride in 3 ml. of dichloroethane. The mixture was heated at 60° C. during 3 hours. The prepared gel was crushed, washed with acetone, a mixture of acetone with 0.5 n solution of hydrochloric acid, water and was dried. The swelling capacity of the obtained product in toluene was equal to 2.8 g. of the solvent per gram of the weight of the dry product.

The dried product was subjected to swelling in dichloroethane and was sulphonated with 98% sulphuric acid at a temperature of 80° C. during 3 hours. In this case a cationite was obtained having an exchange capacity of 5.35 meq./g.

We claim:

1. A method of producing macronet polystyrene backbones for ion exchange resins which comprises reacting linear polystyrene or granular copolymers of styrene with divinylbenzene, the content of said divinylbenzene in the copolymer being up to 1 mole percent, in an inert organic solvent medium in the presence of a Friedel-Crafts type catalyst at a temperature of from 0 to 80° C. with a bifunctional cross-linking compound represented by the formula

where R equals $CH_2Cl$ or $COCl$ and $n$ equals 2 or 3.

2. A method as defined in claim 1, wherein said organic solvent is a solvent capable of dissolving said linear polystyrene or of causing swelling of said granular copolymer.

3. A method as defined in claim 2, wherein said organic solvent is a member of the group consisting of 1,2-dichloroethane, dichloromethane, tetrachloroethane, nitrobenzene, nitropropane, chlorobenzene, and 1,2-dichlorobenzene.

4. Macronet polystyrene backbones for ion exchange resins consisting of cross-linked polymers selected from the group consisting of cross-linked polystyrene and cross-linked copolymers of styrene with divinylbenzene, the content of said divinylbenzene in the copolymer, being up to 1 mole percent, said polymers being linked between benzene rings thereof, the linking bridges being represented by the formula

where R equals $CH_2$ or $CO$ and $n$ equals 2 or 3.

References Cited

UNITED STATES PATENTS

| | | | |
|---|---|---|---|
| 2,462,555 | 2/1949 | Rosenthal | 260—88.2 C |
| 3,261,818 | 7/1966 | Marcantonio | 260—85.1 |
| 3,265,640 | 8/1966 | Overhults | 260—2 |
| 3,294,531 | 12/1966 | Schlesinger | 96—1 |
| 3,417,066 | 12/1968 | Corte | 260—88.1 |
| 3,423,335 | 1/1969 | Phillips | 260—2 |

FOREIGN PATENTS

| | | |
|---|---|---|
| 1,449,553 | 6/1966 | France. |

OTHER REFERENCES

Chemical Abstracts, volume 60:3123e, 1963, "Thermally Stable Styrene Copolymers."

Chemical Abstracts volume 63:4464b, 1965, "Improved Chelating Resins by Cross-Linking with p-Diisopropenylbenzene."

JAMES A. SEIDLECK, Primary Examiner
R. S. BENJAMIN, Assistant Examiner

U.S. Cl. X.R.

260—2.2 R, 88.2 S, 93.5 A